United States Patent

[11] 3,576,500

| [72] | Inventors | Gordon Gould<br>New York, N.Y.;<br>William R. Bennett, Jr., New Haven,<br>Conn.; William T. Walter, Huntington,<br>N.Y. |
|---|---|---|
| [21] | Appl. No. | 510,618 |
| [22] | Filed | Nov. 30, 1965 |
| [45] | Patented | Apr. 27, 1971 |
| [73] | Assignee | Gordon Gould<br>New York, N.Y.<br>Continuation-in-part of application Ser. No. 426,082, Jan. 18, 1965. |

[54] LOW LEVEL LASER WITH CYCLIC EXCITATION AND RELAXATION
11 Claims, 6 Drawing Figs.

[52] U.S. Cl. .................................................. 331/94.5, 330/4.3
[51] Int. Cl. .................................................. H01s 3/00, H01s 3/09, H01s 3/14
[50] Field of Search .......................................... 331/94.5; 330/4.3

[56] References Cited
OTHER REFERENCES

Fowles et al., " High-Gain Laser Transition In Lead Vapor," Applied Physics Letters, Vol. 6, No. 12, June 15, 1965, pps. 236— 237.

*Primary Examiner*—Ronald L. Wibert
*Attorney*—Darby & Darby

ABSTRACT: There are disclosed low energy level lasers employing inelastic collisions to populate the upper laser level and to depopulate the lower laser level wherein the population and depopulation processes are done cyclically rather than simultaneously. The laser is also characterized by the fact that transitions from the upper laser level to the lower laser level (the laser transition) and the (relaxation) transitions from the lower laser level to still lower energy (sink) levels are at least partially forbidden. On the other hand, transitions from the sink level to the upper laser level (the excitation transition) is allowed or at least less strongly forbidden than the relaxation transition.

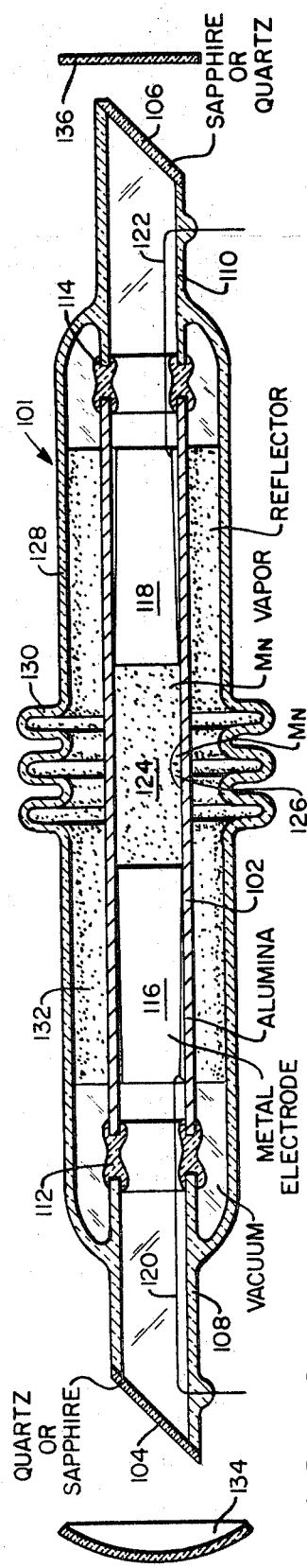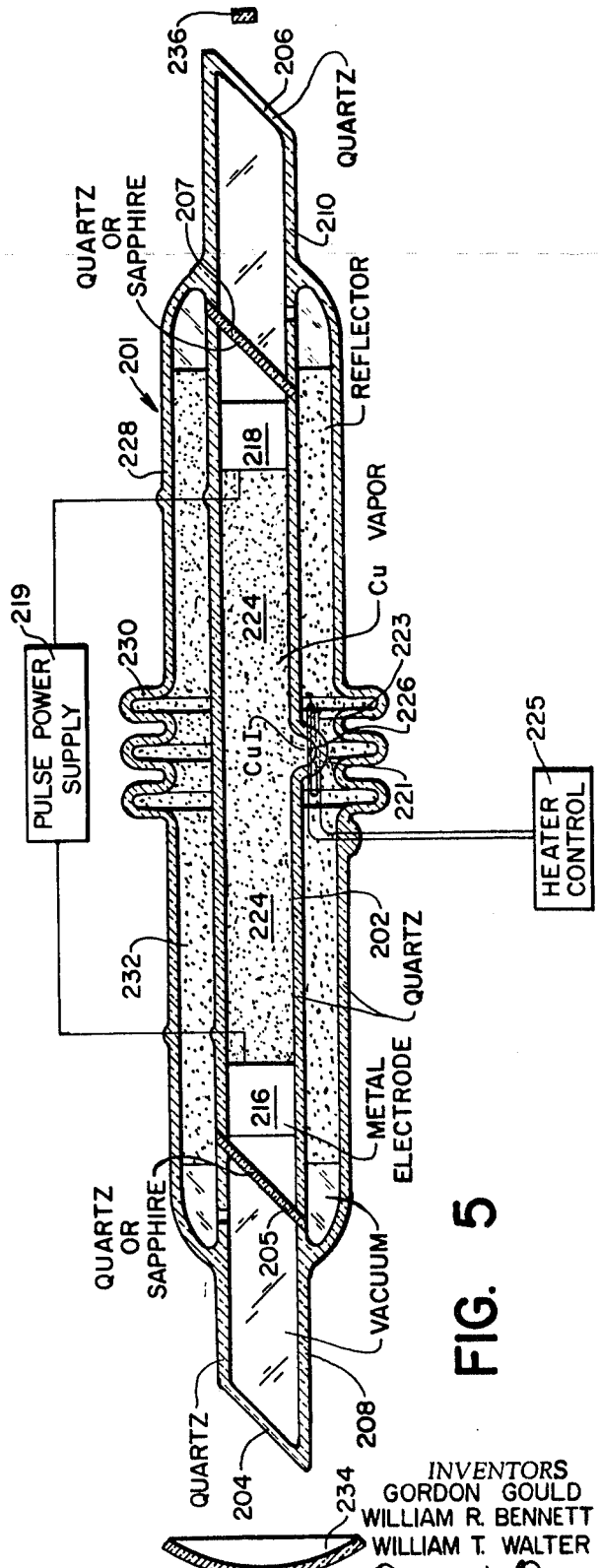

LOW LEVEL LASER WITH CYCLIC EXCITATION AND RELAXATION

This application is a continuation-in-part of prior copending Gordon Gould application Ser. No. 426,082 for Laser Utilizing Collision Depopulation, filed Jan. 18, 1965.

The most common form of gas discharge type lasers rely on spontaneous emission either directly or indirectly to relax the lower level. Such a relaxation process limits the efficiency and power output from such gas discharge lasers. Among the causes of such efficiency limitations is that the level spacing required for an untrapped radiative cascade places the upper and lower laser levels well up in the energy level structure. In such a case the excitation energy resulting in useful laser radiation is a small portion of the total excitation energy required for the process; consequently the quantum efficiency is low. Furthermore, with the upper and lower laser levels high in the energy level structure only a small fraction of electrons have the necessary energy for excitation to the upper laser level, and parasitic loss through useless excitation of lower levels also decreases efficiency.

In a previous proposal (Gordon Gould, "Collision Lasers," Applied Optics Supplement 2 of Chemical Lasers, pages 59-—67, 1965) some of the above disadvantages were pointed out, and avoidance thereof was proposed by utilization of collision depopulation (relaxation) of the lower laser level. The principles of the collision laser as proposed were sound, but the invention herein incorporates a further technique which substantially relaxes the requirements for a proper energy level structure to provide an efficient laser utilizing collision depopulation (relaxation) of the lower laser level. The technique employed in the present invention is cyclic excitation and relaxation. This technique makes it unnecessary to simultaneously maintain proper conditions for excitation of the upper laser level and for relaxation of the lower laser level. This, naturally, precludes continuous operation of the laser, but there are many laser applications which permit, or even require, pulsed operation. High average power is attainable by a high repetition rate (over 1,000 per sec.).

An important feature of lasers according to this invention, which will be referred to as low-level cyclic lasers or simply cyclic lasers, is the fact that the transition between the lower laser level and the sink level (typically the sink level is a level in the ground term) is forbidden or at least partially forbidden. The forbidden nature of this transition may arise because the levels are of the same parity, for example.

In the cyclic laser the transition from the sink level to the upper laser level is preferably an allowed transition or in any event not more forbidden than the transition between the lower laser level and the sink level. This provides a mechanism for preferential population of the upper laser level as compared with the lower laser level due to the forbidden transition associated with the lower laser level. The forbidden transition between the lower level and the sink level results in the stimulated emission being self-terminating as the lower level is rapidly filled by stimulated emission from the upper level with a resultant loss in the population inversion. In the cyclic laser the self-termination of the laser pulse is tolerable since it is designed to cyclically interrupt the excitation process and produce conditions conductive to relaxation of the lower laser level. During this period the upper laser level is also depopulated and this represents a slight loss in efficiency. This loss, however, is well compensated by other advantages of the cyclic laser operation.

Another important characteristic for an efficient cyclic laser is that the energy level structure be such that spontaneous emission from the upper laser level to the sink level is trapped. The trapping of spontaneous emission from the upper laser level may be achieved when there is a high population in the sink level as in the case of a sink level comprising the single ground level in the energy level structure.

In the low-level cyclic laser, it is also necessary that the laser levels be low in the energy level structure. As will be seen from the following more detailed discussion, the energy level values for the upper and lower laser levels for optimum efficiency differs from the levels which would be required in the noncyclic low-level collision laser previously referred to.

The cyclic laser has a common characteristic with the noncyclic collision laser in that the debilitating reliance on spontaneous emission is eliminated to provide inherently greater efficiency (the cycle laser is expected to produce average laser power on the order of 0.1 watt/centimeter$^3$ with potential efficiency of approximately 10 percent). The cyclic laser however, provides advantages over the noncyclic collision laser, particularly with respect to generation of short wavelength radiation (for example, in the visible and possibly ultraviolet regions). This is basically due to the fact that selective population of the upper laser level is achieved by a technique which allows the upper laser level to be at a fairly high energy level, the prime consideration being that the lower laser level be at a low (but not too low) energy level. Thus, the separation between upper and lower laser level can be substantial with a resulting high energy short wavelength laser output. It appears that conditions for efficient cyclic laser operation at visible wavelengths will be as good or better than at infrared wavelengths, and the projected performances in terms of power, efficiency, and the like are for visible wavelengths.

It is an object of the present invention to provide a low-level cyclic laser with high efficiency for the conversion of electrical energy into coherent light energy at visible and near visible wavelengths.

It is another object of the present invention to provide a high efficiency cyclic laser apparatus capable of producing short pulses at a high repetition rate and high average power.

Other objects and advantages will be apparent from a consideration of the following description in conjunction with the appended drawings, in which:

FIG. 4, is a high temperature laser apparatus for a cyclic laser according to the present invention utilizing manganese as a working medium by way of illustration;

FIG. 5, is an alternative form of high temperature laser apparatus for cool wall operation as a cyclic laser and utilizing by way of example, copper as the working medium.

Figure 1:
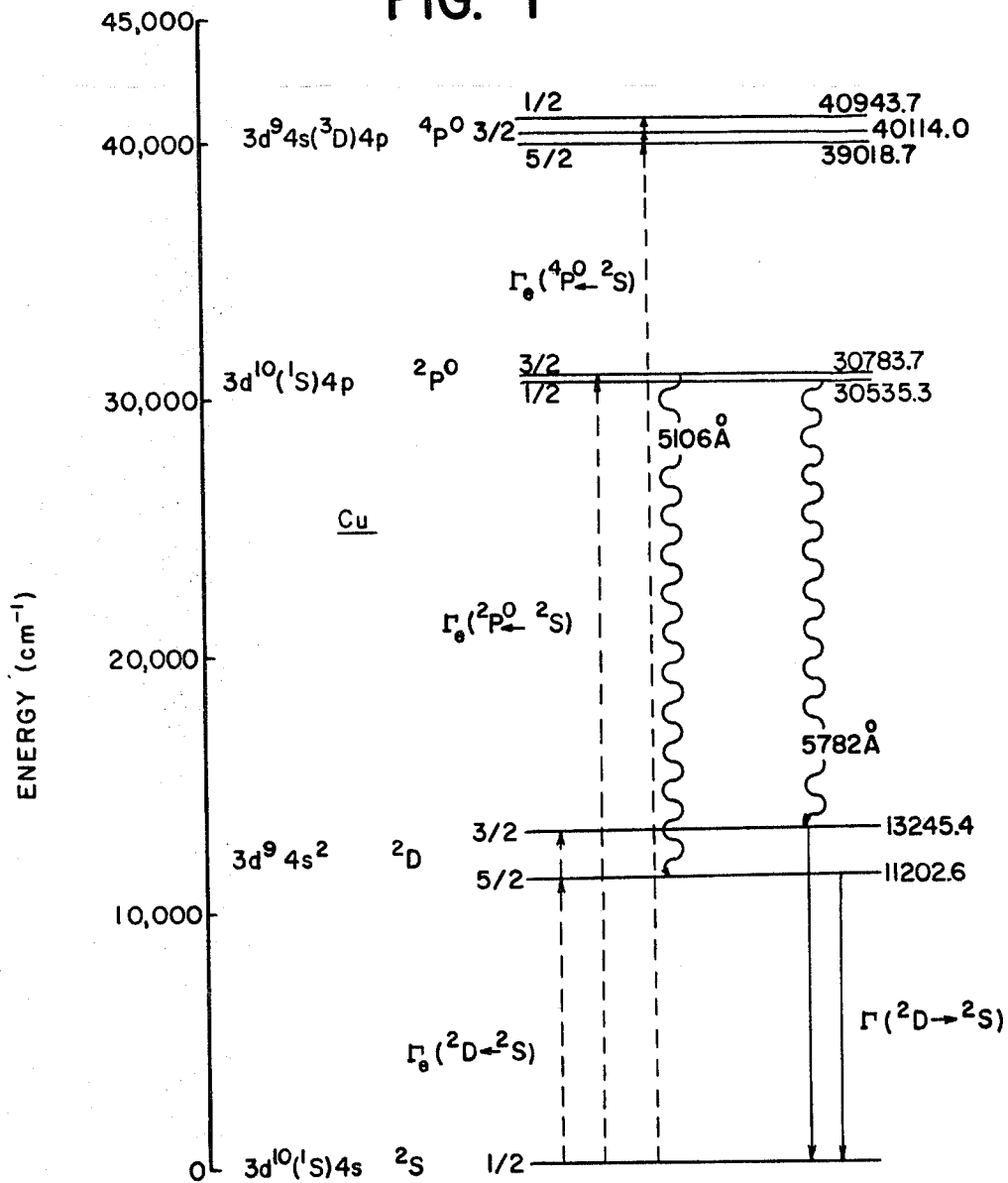
FIG. 1, is an energy level diagram of copper useful in explaining the operation of a low-level cyclic laser utilizing copper as a working medium.

In the explanation which follows the terms laser and light amplifier will be used interchangeably to refer to apparatus making use of the phenomenon of light amplification by stimulated emission of radiation.

A discussion of theoretical considerations relating to the low-level cyclic laser of the present invention is useful before considering specific illustrative forms of cyclic laser apparatus.

From the previous introductory explanation, it will be appreciated that poor laser efficiency is to be expected if the energy of excitation to the upper laser level (or the uppermost level in the essential laser energy circuit) is much greater than the laser transition energy. Unfortunately, this must be the case if spontaneous emission is to depopulate the lower level. Relaxation by inelastic collisions renders it unnecessary to use laser levels lying high in the energy level structure, but according to previous proposals such low energy level lasers should also have a mechanism for simultaneously selectively populating the upper level and selectively depopulating the lower level, both at a rate sufficient to maintain a population inversion. The cyclic laser avoids the necessity for simultaneous excitation and relaxation processes, thus considerably widening the choice of working media which may be utilized and widening the available range of laser characteristics (e.g., output wavelength).

In the common laser systems of the prior art, the spontaneous decay rate of the excited level is greater than $10^7/S$, characteristic of "allowed" electric dipole radiative transitions. Since the excitation rate is of the order of $10^5/sec.$-atom even using the efficient and selective method of collisions of the second kind, the excited level population could not be made greater than the ground level population. Therefore, light amplifier action or emission in the common prior art laser systems occurs only to an intermediate level whose population is kept lower by an even faster rate of spontaneous decay.

In "collision lasers" depopulation of a lower laser level by collisions of the second kind is contemplated. The collision laser requires that the relaxation process employed to depopulate the lower laser level be such that it does not substantially depopulate the upper laser level (which would have the undesirable effect of reducing the population inversion). This technique of collision lasers is limited to working media with energy level structures of a rather special kind.

The cyclic laser according to the present invention has the advantage that excitation and relaxation occur during different time intervals and it is unnecessary that the relaxation mechanism for the lower laser level be one that does not affect the upper laser level.

In the low-level cyclic laser the laser transition is partially forbidden. This prevents the transitions from occurring so rapidly as to make it difficult or impossible to build up and exploit a population inversion during a current pulse. The buildup of the population in the upper laser level is expedited by an allowed transition between the sink level and the upper laser level with a high electron cross section for the transition. In rare cases the sink to upper level transition could be partially forbidden, but this is not the optimum situation. The low-level cyclic laser is also rendered more efficient by having as a sink level a single ground level, or at most a few closely spaced "isolated" ground levels. Such an energy level structure results in trapping of spontaneous radiation from the upper laser level to the ground level due to the high population in the ground level (or levels). Possible "leakage" of excited atoms through other than the laser transition is thus minimized.

Further discussion of the low-level cyclic laser will be facilitated by reference to a particular example. Theoretical analysis has lead to copper as a very promising element for utilization in a low-level cyclic laser. The theoretical analysis has been confirmed by experimental construction of a copper vapor laser.

An energy level diagram for lower energy levels of copper is shown in FIG. 1.

Two practical laser transitions are shown in FIG. 1 in wavy lines. The first transition process a wave length of 5106A. resulting in a green laser light emission. It should be noted that the lower laser level for this laser transition is at an energy level of only 11,200 wave numbers. It is axiomatic that in the three (or more) level laser systems wherein there is an upper laser level, a lower laser level, and a sink level, the energy lost in the transition from the lower laser level to the sink level is inherently wasted and represents a basic limitation on efficiency. Accordingly, it is highly desirable that the energy level of the lower laser level be kept at a low value.

It should here be noted however, that in the case of the cyclic laser, there is also an effective lower limit for the lower laser level energy (one which does not exist in the case of the low-level collision laser, for example). The limit on lower laser level energy arises from the fact that the lower laser level is not depopulated below its normal equilibrium population during the laser pulse and, on the contrary, fills up during the laser pulse to the point where its population is sufficiently high to destroy the population inversion with the upper laser level. Thus, the lower laser level must have a sufficiently high energy so that its normal equilibrium population does not virtually prevent the exploitation of a population inversion with respect to the higher energy upper laser level. By way of example it may be considered desirable to have the equilibrium population of the lower laser level not more than 0.1 percent of the total population. Using this as a criterion, together with the fact that metal vapors with appropriate energy levels vaporize at about 1,000° C., or more, a minimum lower laser level energy can be calculated. The relationship is $\mathrm{Exp}[E_e/kTg]<0.001$.

At 1,273° K., $KT_g$=850 cm. $^1$. Substituting the value for $KT_g$ in the formula above, indicates a maximum value for $E_1$ greater than approximately 6,000 wave numbers.

On the other hand, an energy about three times this value, that is 18,000 wave numbers, represents approximately a point at which the basic advantages of low lying laser levels fail to be achieved. Eighteen thousand wave numbers is about the energy usefully extracted as laser radiation in the midvisible light regions. One would prefer not to sacrifice more than this amount of energy in the wasted transition from the lower laser level to the sink level, particularly in view of a number of other unavoidable losses which will limit the maximum efficiency obtainable.

Thus, it may be seen that as a rule of thumb, one would prefer that working media for use in lower level cyclic lasers have a suitable energy level between 6,000 and 18,000 wave numbers approximately for use as the lower laser level. Obviously, the working media should have a suitable upper laser energy level spaced above the lower laser level such that the energy difference and resulting wavelength is appropriate for the particular application of the laser which one has in mind.

From FIG. 1 it will be seen that copper vapor meets the requirement set forth above for a laser having a visible output and that transitions are available both at 5106A. (green) and at 5782A. (yellow).

It is also desirable that the upper laser level be the first resonance level above the ground level. This assures highly selective pumping to the upper laser level to the exclusion of other levels higher than the upper laser level. This tends to eliminate unwanted transitions which would be a source of losses leading to inefficiency. Nearly the same advantages are obtained if the upper laser level is close to the first resonance level.

It will be noted that the above described criteria are met by the energy level structure of copper shown in FIG. 1.

It has previously been explained that the laser transition in the low-level cyclic laser should be partially forbidden and this situation also prevails for the copper laser as shown in FIG. 1. It is also desirable that energy levels above the upper laser level (or levels) should be relatively distant or otherwise poorly coupled to the ground level so that relatively little energy is wasted in pumping to levels above the upper laser level. This situation also prevails in copper.

The copper energy level structure is also ideal from another point of view in that the ground level which constitutes the sink level is a single isolated level so that the upper laser level is trapped whereby loss of energy through transitions directly from the upper laser level to the sink level is minimized.

It should further be noted that low-level cyclic lasers involve neutral atoms rather than ions. Thus no energy is lost in the ionization of particles as would be the case in ion lasers. The copper laser and others discussed herein all utilize neutral atoms.

It should further be noted that it is desirable to depopulate the lower laser level fairly rapidly for various reasons, among which is to enable one to operate the laser at a high repetition rate. Relaxation of the lower laser level may take place primarily by three mechanisms: (1) diffusion to (and collision with) the wall of the laser, (2) collision with cool electrons, (3) collision with molecules of a gas added for this purpose, (e.g., nitrogen). Relaxation by diffusion to the laser wall is facilitated by a small diameter laser tube, but this puts an undesirable constraint upon the volume of the laser. Collision with cool electrons can be enhanced by the inclusion of a buffer gas to cool the electrons, particularly helium.

Figure 2:
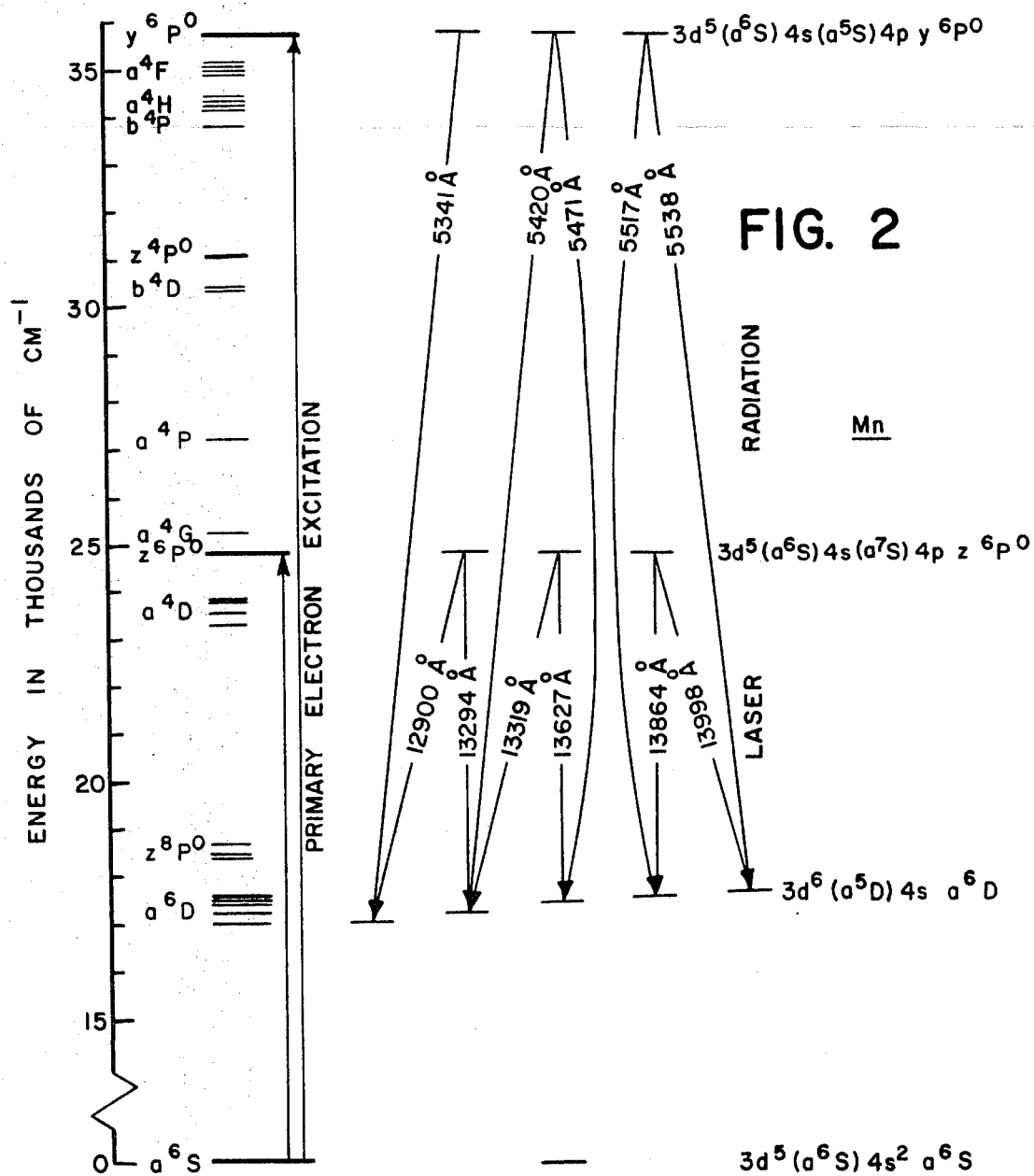
FIG. 2, is an energy level diagram for manganese useful in explaining the operation of a cyclic laser utilizing manganese as a working medium.

FIG. 2 shows the energy diagram for the lower energy levels of manganese which has also proven to be a practical working medium for a low-level cyclic laser. The manganese laser is not quite as desirable as the copper laser from the point of view of efficiency, but it meets most of the criteria set forth previously. It is somewhat undesirable to have many competing potential laser transitions as in the manganese laser. It will also be noted that the lower laser levels are at about 17,000 wave numbers as compared with about 11,000 in the case of copper. The latter is naturally more desirable from the point of view of quantum efficiency.

It should be pointed out that laser transitions have been noted and reported in the literature where it was necessary or desirable to operate the laser with pulses of excitation energy. In previous cases, however, the laser transitions were not transitions which tended to produce an efficient conversion of electrical energy to coherent light energy. For the most part the transitions operated in such a pulse fashion were merely laboratory demonstrations adding to the long list of transitions demonstrated to be possible laser transitions.

Examples of elements which have been pulsed to produce traces of laser radiation are neon and some other noble gases, zinc, cadmium, and lead. In addition there have been demonstrations of laser operation with pulsed ionic working media.

The present invention is not concerned particularly with the fact that laser operation can be achieved by pulsing, but is rather concerned with the fact that there is a class of laser transitions having particularly desirable characteristics from the point of view of efficiency, and that it is inherent in the nature of these transitions that they will operate only in a pulsed fashion as in the low-level cyclic laser herein described. A more complete list of such potential low-level cyclic laser transitions is set forth in Table I below.

TABLE I.—POTENTIAL LOW LEVEL CYCLIC LASER TRANSITIONS IN ATOMIC VAPORS

[WAVELENGTH GIVEN IN AIR ABOVE 2,000 A. AND IN VACUUM BELOW 2,000 A.]

| Element | Laser wavelength, A. | Laser transition (energy in cm.$^{-1}$) | |
| --- | --- | --- | --- |
| Carbon | 1,994<br>1,992<br>1,855<br>1,855<br>1,855 | $^3P_1°(60,353) \rightarrow$<br>$^3P_2°(60,394) \rightarrow$<br>$^3D_1°(64,092) \rightarrow$<br>$^3D_2°(64,093) \rightarrow$<br>$^3D_3°(64,089) \rightarrow$ | $^1D_2(10,194)$<br>$^1D_2(10,194)$<br>$^1D_2(10,194)$<br>$^1D_2(10,194)$<br>$^1D_2(10,194)$ |
| Oxygen | 1,641 | $^3S_1°(76,795) \rightarrow$ | $^1D_2(15,868)$ |
| Silicon | 2,988<br>4,103 | $^3P_1°(39,760) \rightarrow$<br>$^3P_1°(39,760) \rightarrow$ | $^1D_2(6,298)$<br>$^1S_0(15,394)$ |
| Phosphorus | 2,243<br>2,223<br>2,236 | $^4P_{1/2}°(55,939) \rightarrow$<br>$^4P_{5/2}°(56,340) \rightarrow$<br>$^4P_{3/2}°(56,091) \rightarrow$ | $^2D_{3/2}°(11,362)$<br>$^2D_{5/2}°(11,376)$<br>$^2D_{5/2}°(11,376)$ |
| Sulphur | 1,706 | $^3D_3°(67,843) \rightarrow$ | $^1D_2(9,239)$ |
| Scandium | 13,100<br>13,079<br>12,750<br>12,495 | $y\,^2P_{1/2,3/2}°(24,657) \rightarrow$<br>$y\,^2P_{3/2}°(24,657) \rightarrow$<br>$y\,^2D_{3/2}°(24,866) \rightarrow$<br>$y\,^2D_{5/2}°(25,014) \rightarrow$ | $b\,^2D_{3/2}(17,025)$<br>$b\,^2D_{5/2}(17,013)$<br>$b\,^2D_{3/2}(17,025)$<br>$b\,^2D_{5/2}(17,013)$ |
| Titanium | 12,831<br>23,719<br>51,178<br>8,692<br>8,735<br>11,893<br>38,920<br>51,475 | $z\,^3F_2°(19,323) \rightarrow$<br><br><br><br><br>$z\,^3D_1°(19,938) \rightarrow$ | $b\,^3F_2(11,532)$<br>$a\,^3G_3(15,108)$<br>$a\,^3D_1(17,370)$<br>$a\,^3P_0(8,437)$<br>$a\,^3P_1(8,492)$<br>$b\,^3F_2(11,532)$<br>$a\,^3D_1(17,370)$<br>$b\,^3P_0(17,996)$ |
| | 10,060<br>15,716 | $z\,^3G_3°(21,470) \rightarrow$ | $b\,^3F_2(11,532)$<br>$a\,^3G_3(15,108)$ |
| | 5,389<br>7,364<br>9,998<br>12,920 | $y\,^3F_2°(25,107) \rightarrow$ | $a\,^3F_1(6,557)$<br>$b\,^3F_2(11,532)$<br>$a\,^3G_3(15,108)$<br>$a\,^3D_1(17,370)$ |
| Vanadium | 8,242<br>9,037<br>18,084<br>18,735<br>20,230 | $z\,^4D_{1/2}°(20,606) \rightarrow$ | $a\,^4D_{3/2}(8,476)$<br>$a\,^4P_{1/2}(9,545)$<br>$b\,^4P_{1/2}(15,078)$<br>$b\,^4P_{3/2}(15,270)$<br>$b\,^4F_{3/2}(15,665)$ |
| | 14,423<br>16,185<br>20,885 | $z\,^4G_{5/2}°(21,841) \rightarrow$ | $a\,^4H_{7/2}(14,910)$<br>$b\,^4F_{3/2}(15,665)$<br>$a\,^4G_{5/2}(17,055)$ |
| | 6,812<br>6,842<br>13,467<br>16,570 | $z\,^4F_{3/2}°(23,088) \rightarrow$ | $a\,^4D_{1/2}(8,413)$<br>$a\,^4D_{3/2}(8,476)$<br>$b\,^4F_{3/2}(15,665)$<br>$a\,^4G_{5/2}(17,055)$ |
| | 5,707<br>5,728<br>9,738<br>11,264 | $y\,^4F_{3/2}°(25,931) \rightarrow$ | $a\,^4D_{1/2}(8,413)$<br>$a\,^4D_{3/2}(8,476)$<br>$b\,^4F_{3/2}(15,665)$<br>$a\,^4G_{5/2}(17,055)$ |
| Chromium | 4,942<br>5,123<br>4,965<br>6,330<br>6,630<br>6,363 | $y\,^7P_3°(27,820) \rightarrow$<br><br>$y\,^7P_2°(27,729) \rightarrow$<br>$z\,^7P_3°(23,386) \rightarrow$<br><br>$z\,^7P_2°(23,305) \rightarrow$ | $a\,^5S_2(7,593)$<br>$a\,^5D_4(8,308)$<br>$a\,^5S_2(7,593)$<br>$a\,^5S_2(7,593)$<br>$a\,^5D_4(8,308)$<br>$a\,^5S_2(7,593)$ |

Table I – Continued

| Element | Laser wavelength, A. | Laser transition (energy in cm.$^{-1}$) | |
| --- | --- | --- | --- |
| Manganese | 5,341<br>5,407<br>5,420<br>5,471<br>5,506<br>5,481<br>5,517<br>5,538<br>12,900<br>13,294<br>13,319<br>13,627<br>13,847<br>13,643<br>13,864<br>13,997 | $y\,^6P_{7/2}°(35,770) \rightarrow$<br><br><br>$y\,^6P_{5/2}°(35,726) \rightarrow$<br><br>$y\,^6P_{3/2}°(35,690) \rightarrow$<br><br><br>$z\,^6P_{7/2}°(24,802) \rightarrow$<br><br><br>$z\,^6P_{5/2}°(24,788) \rightarrow$<br><br><br>$z\,^6P_{3/2}°(24,779) \rightarrow$ | $a\,^6D_{9/2}(17,052)$<br>$a\,^6D_{7/2}(17,282)$<br>$a\,^6D_{7/2}(17,282)$<br>$a\,^6D_{5/2}(17,452)$<br>$a\,^6D_{3/2}(17,568)$<br>$a\,^6D_{5/2}(17,452)$<br>$a\,^6D_{3/2}(17,568)$<br>$a\,^6D_{1/2}(17,637)$<br>$a\,^6D_{9/2}(17,052)$<br>$a\,^6D_{7/2}(17,282)$<br>$a\,^6D_{7/2}(17,282)$<br>$a\,^6D_{5/2}(17,452)$<br>$a\,^6D_{3/2}(17,568)$<br>$a\,^6D_{5/2}(17,452)$<br>$a\,^6D_{3/2}(17,568)$<br>$a\,^6D_{1/2}(17,637)$ |
| Iron | 5,270<br>5,397<br>5,501<br>11,973<br>5,328<br>5,430<br>5,507<br>11,638<br>11,884<br>5,012<br>5,127<br>5,052<br>8,689<br>8,824 | $z\,^5D_4°(25,900) \rightarrow$<br><br><br><br>$z\,^5D_3°(26,140) \rightarrow$<br><br><br><br><br>$z\,^5F_5°(26,875) \rightarrow$<br><br>$z\,^5F_4°(27,167)$<br>$z\,^5P_3°(29,056) \rightarrow$ | $a\,^5F_5(6,928)$<br>$a\,^5F_4(7,377)$<br>$a\,^5F_3(7,728)$<br>$a\,^5P_3(17,550)$<br>$a\,^5F_4(7,377)$<br>$a\,^5F_3(7,728)$<br>$a\,^5F_2(7,986)$<br>$a\,^5P_3(17,550)$<br>$a\,^5P_2(17,727)$<br>$a\,^5F_5(6,928)$<br>$a\,^5F_4(7,377)$<br>$a\,^5F_4(7,377)$<br>$a\,^5P_3(17,550)$<br>$a\,^5P_2(17,727)$ |
| Cobalt | 3,820<br>3,887<br>3,941<br>6,431<br>3,735<br>7,355<br>6,450<br>7,085<br>7,987 | $y\,^5D_4°(33,096) \rightarrow$<br><br><br><br>$y\,^5F_5(33,695) \rightarrow$<br>$z\,^4F_{7/2}°(28,777) \rightarrow$<br><br>$z\,^4D_{7/2}°(29,295) \rightarrow$ | $a\,^5F_5(6,928)$<br>$a\,^5F_4(7,377)$<br>$a\,^5F_3(7,728)$<br>$a\,^5P_3(17,550)$<br>$a\,^5F_5(6,928)$<br>$b\,^4P_{5/2}(15,184)$<br>$a\,^4P_{5/2}(13,796)$<br>$b\,^4P_{5/2}(15,184)$<br>$a\,^2D_{5/2}(16,778)$ |
| Nickel | 3,936<br>4,086<br>4,371<br>6,191<br>7,111<br>5,712 | $y\,^4F_{9/2}°(32,842) \rightarrow$<br>$x\,^4D_{7/2}°(39,649) \rightarrow$<br><br>$z\,^3D_3°(29,669) \rightarrow$<br><br>$y\,^3F_3°(33,112) \rightarrow$ | $a\,^2F_{7/2}(7,442)$<br>$b\,^4P_{5/2}(15,184)$<br>$a\,^2D_{5/2}(16,778)$<br>$b\,^1D_2(13,521)$<br>$a\,^3P_2(15,610)$<br>$a\,^3P_2(15,610)$ |
| Copper | 5,782<br>5,106<br>5,700 | $^2P_{1/2}°(30,535) \rightarrow$<br>$^2P_{3/2}°(30,748) \rightarrow$ | $^2D_{3/2}(13,245)$<br>$^2D_{5/2}(11,203)$<br>$^2D_{3/2}(13,245)$ |
| Germanium | 3,269<br>4,686<br>3,039<br>4,227<br>3,067 | $^3P_1°(37,702) \rightarrow$<br><br>$^1P_1°(40,020) \rightarrow$<br><br>$^3D_1°(48,962) \rightarrow$ | $^1D_2(7,125)$<br>$^1S_0(16,367)$<br>$^1D_2(7,125)$<br>$^1S_0(16,367)$<br>$^1S_0(16,367)$ |

Pat. No.: 3576500

| Element | Laser wavelength, A. | Laser transition (energy in cm.$^{-1}$) | |
| --- | --- | --- | --- |
| Arsenic | 2,493<br>3,075<br>3,120<br>2,437<br>2,457<br>2,991<br>3,033 | $^4P_{1/2}°(50,694) \rightarrow$<br><br><br>$^4P_{3/2}°(51,610) \rightarrow$ | $^2D_{3/2}°(10,592)$<br>$^2P_{1/2}°(18,186)$<br>$^2P_{3/2}°(18,647)$<br>$^2D_{3/2}°(10,592)$<br>$^2D_{5/2}°(10,915)$<br>$^2P_{1/2}°(18,186)$<br>$^2P_{3/2}°(18,647)$ |
| Selenium | 2,590<br>2,414 | $^5S_2°(48,182) \rightarrow$<br>$^3S_1°(50,997) \rightarrow$ | $^1D_2(9,576)$<br>$^1D_2(9,576)$ |
| Strontium | 28,245<br>28,730 | $^1P_1°(21,698) \rightarrow$ | $^3D_1(18,159)$<br>$^3D_2(18,219)$ |
| Yttrium | 9,567<br>9,753<br>16,120<br>17,650<br>18,064<br>7,659<br>11,355<br>12,286<br>12,540<br>7,438<br>7,550<br>10,876<br>11,552<br>13,286 | <br><br>$z\,^2F_{5/2}°(21,529) \rightarrow$<br><br><br><br><br>$y\,^2D_{3/2}°(24,131) \rightarrow$<br><br><br><br>$y\,^2F_{5/2}°(24,519) \rightarrow$ | $a\,^4F_{5/2}(11,079)$<br>$a\,^4F_{7/2}(11,278)$<br>$a\,^2F_{5/2}(15,327)$<br>$a\,^2F_{7/2}(15,864)$<br>$b\,^2D_{3/2}(15,994)$<br>$a\,^4F_{5/2}(11,079)$<br>$a\,^2F_{5/2}(15,327)$<br>$b\,^2D_{3/2}(15,994)$<br>$b\,^2D_{5/2}(16,159)$<br>$a\,^4F_{5/2}(11,079)$<br>$a\,^4F_{7/2}(11,278)$<br>$a\,^2F_{5/2}(15,327)$<br>$a\,^2F_{7/2}(15,864)$<br>$b\,^2D_{3/2}(15,994)$ |
| | 7,933<br>8,001<br>8,451 | $x\,^2P_{1/2}°(27,824) \rightarrow$ | $a\,^4P_{1/2}(15,222)$<br>$a\,^4P_{3/2}(15,329)$<br>$b\,^2D_{3/2}(15,994)$ |
| Palladium | 3,517<br>3,832<br>4,087<br>3,065<br>3,302<br>3,490<br>3,252<br>3,433 | <br>$^3P_1°(36,181) \rightarrow$<br><br><br>$^3D_1°(40,369) \rightarrow$<br><br><br>$^1P_1°(40,839) \rightarrow$ | $^3D_2(7,755)$<br>$^3D_1(10,094)$<br>$^1D_2(11,722)$<br>$^3D_2(7,755)$<br>$^3D_1(10,094)$<br>$^1D_2(11,722)$<br>$^3D_1(10,994)$<br>$^1D_2(11,722)$ |
| Tin | 3,801<br>5,632<br>3,262<br>4,525 | $^3P_1°(34,914) \rightarrow$<br><br>$^1P_1°(39,257) \rightarrow$ | $^1D_2(8,613)$<br>$^1S_0(17,163)$<br>$^1D_2(8,613)$<br>$^1S_0(17,163)$ |
| Antimony | 2,878<br>3,723<br>4,034<br>2,671<br>2,770<br>3,383<br>3,638 | $^4P_{1/2}°(43,249) \rightarrow$<br><br><br><br><br>$^4P_{3/2}°(45,945) \rightarrow$ | $^2D_{3/2}°(8,512)$<br>$^2P_{1/2}°(16,396)$<br>$^2P_{3/2}°(18,464)$<br>$^2D_{3/2}°(8,512)$<br>$^2D_{5/2}°(9,854)$<br>$^2P_{1/2}°(16,396)$<br>$^2P_{3/2}°(18,464)$ |
| Tellurium | 2,511<br>2,598<br>3,347<br>2,967<br>2,770 | $^4P_{5/2}°(48,332) \rightarrow$<br><br>$^4P_{5/2}°(48,332) \rightarrow$<br>$^5S_2°(44,253) \rightarrow$<br>$^3S_1°(46,653) \rightarrow$ | $^2D_{3/2}°(8,512)$<br>$^2D_{5/2}°(9,854)$<br>$^2P_{3/2}°(18,464)$<br>$^1D_2(10,559)$<br>$^1D_2(10,559)$ |

Table 1—Continued

| Element | Laser wavelength, A. | Laser transition (energy in cm.$^{-1}$) | |
|---|---|---|---|
| Iodine | 1,844<br>1,876<br>2,062<br>1,799 | $^4P_{3/2}(61,820) \rightarrow$<br>$^4P_{1/2}(60,896) \rightarrow$<br>$^2P_{3/2}(56,093) \rightarrow$<br>$^2P_{1/2}(63,187) \rightarrow$ | $^2P_{1/2}(7,603)$ |
| Barium | 11,076<br>11,303<br>11,812<br>15,000 | $^1P_1°(18,060) \rightarrow$ | $^3D_1(9,034)$<br>$^3D_2(9,216)$<br>$^3D_3(9,597)$<br>$^1D_2(11,395)$ |
| Rhenium | 5,777<br>5,834<br>6,813<br>7,007<br>7,620 | $z^6P_{7/2}°(28,890) \rightarrow$ | $a\ ^4P_{5/2}(11,584)$<br>$a\ ^6D_{9/2}(11,755)$<br>$a\ ^6D_{7/2}(14,217)$<br>$a\ ^4G_{5/2}(14,621)$<br>$a\ ^6D_{5/2}(15,770)$ |
| | 6,652<br>6,830<br>7,024<br>7,247<br>7,614<br>7,981 | $z^6P_{5/2}°(28,854) \rightarrow$ | $a\ ^4P_{3/2}(13,826)$<br>$a\ ^6D_{7/2}(14,217)$<br>$a\ ^4G_{5/2}(14,621)$<br>$a\ ^4G_{7/2}(15,058)$<br>$a\ ^6D_{5/2}(15,770)$<br>$a\ ^6D_{3/2}(16,328)$ |
| | 5,753<br>6,605<br>6,972<br>7,579<br>7,913<br>8,528 | $z^6P_{3/2}°(28,962) \rightarrow$ | $a\ ^4P_{5/2}(11,583)$<br>$a\ ^4P_{3/2}(13,826)$<br>$a\ ^4G_{5/2}(14,621)$<br>$a\ ^6D_{5/2}(15,770)$<br>$a\ ^6D_{3/2}(16,328)$<br>$a\ ^6D_{1/2}(17,238)$ |
| Gold | 3,123 | $^2P_{3/2}°(41,174) \rightarrow$ | $^2D_{5/2}(9,161)$ |
| Bismuth | 4,722 | $^4P_{1/2}°(32,588) \rightarrow$ | $^2D_{3/2}(11,419)$ |

Additional Cyclic Laser Transitions. Here the original level reached by electron collision decays quickly by radiation to a second level which is the upper laser level.

| Element | Laser wavelength, A. | Laser transition (energy in cm.$^{-1}$) | | Excitation wavelength, A. |
|---|---|---|---|---|
| Calcium | 15,057<br>15,301 | $^1D_2(21,850) \rightarrow$ | $^3P_1°(15,210)$<br>$^3P_2°(15,316)$ | a 4,227<br>a 4,227 |
| Strontium | 17,709<br>19,038 | $^1D_1(20,150) \rightarrow$ | $^3P_1°(14,504)$<br>$^3P_2°(14,899)$ | b 4,607<br>b 4,607 | a Electron excitation is followed by $^1P_1°(23,650) \rightarrow {}^1D_2(21,850)$ 55,457 A. radiation (possibly also laser) to reach the upper $^1D_2$ laser level.
b Electron excitation is followed by $^1P_1°(21,689) \rightarrow {}^1D_2(20,150)$ 64,550 A. radiation (possibly also laser) to reach the upper $^1D_2$ laser level.

NOTE: In addition to the above, the following elements have low-lying transitions suitable for the low level cyclic laser: zirconium, niobium, molybdenum, technetium, ruthenium, rhodium, lanthanum, the rare earths, hafnium, tantalum, tungsten, osmium, iridium, platinum.

In addition to the specific transitions set forth in the above table other transitions in those elements may be favorable and particularly transitions involving energy levels in the same spectroscopic term as those specified above.

It may be noted that a potential upper laser level exists in lead at about four electron volts (about 35,000 wave numbers) which could if coupled with a suitable lower laser level at low energy satisfy some of the criteria herein discussed. However, in lead the trapping of the upper laser level is poor due to the numerous widely spaced ground term levels and the laser transition is not forbidden.

It may be noted that the possibility of low-level cyclic laser transitions in molecules has not been discussed. The reason for this omission is that molecules have a multiplicity of levels so that there is almost certain to be much energy lost in the excitation of levels which do not participate in the laser process.

A discussion of the unavoidable losses in the low-level cyclic laser will be useful to provide indications of ultimately obtainable efficiency. For simplicity, the specific values for copper will be used by way of example. Three main factors must be considered:

a. Approximately 35 percent of the total energy must be lost in relaxing the lower level. This is the ratio of the energy of the lower laser level relative to the upper laser level.

b. The efficiency with which the upper laser level may be excited is estimated at 60 percent by comparison with the efficiency of excitation of comparable resonance radiation, for example 2,537A. resonance radiation in mercury.

c. A fraction of the excited atoms must remain in the upper level to maintain a population inversion. This fraction is approximately one-half. The product of three factors (a), (b) and (c) is approximately 0.2. This product does not take into account difficulties which may arise in efficiently energizing the discharge in quite short pulses. Thus the ultimate efficiency achievable in copper should be considered somewhat below 0.2 and has been estimated to be approximately 10 percent.

Figure 3:
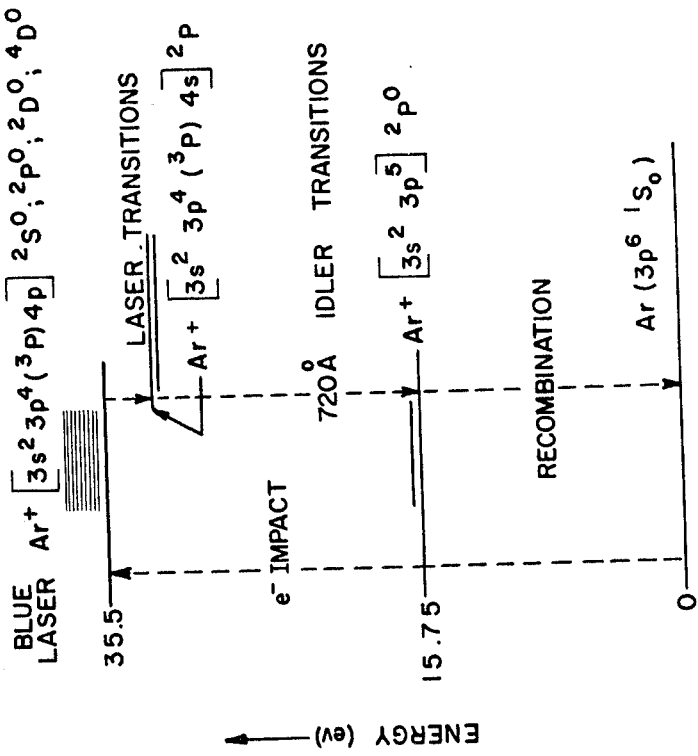
FIG. 3, is an energy level diagram of argon I and II useful in explaining the limitations of previous lasers and the advantages of lasers according to the present invention.

In FIG. 3, an energy level diagram of the argon ion laser is shown exemplifying the manner in which greater efficiency is achieved by the low-level cyclic laser as compared with such previous lasers. An ion laser has inherent inefficiencies. For example, it is estimated that the average cross section for ionization directly to the upper laser level in the argon ion laser is less than about 1 percent of that to the ion ground level. Other useless excitation of the neutral argon levels together with transitions within the energy level diagram which do not contribute to the laser process cut the efficiency by a factor of 0.1. Finally, the fact that the argon ion laser is not a low-level laser leads to only 10 percent of the energy of the emitting atoms being extracted in the laser transition. Multiplication of the above factors accounts for an overall efficiency of the argon ion laser of less than 0.0001.

It is useful at this point to summarize the foregoing discussion indicating the criteria for an efficient low-level cyclic laser according to the invention. The primary excitation of the atoms is by collisions with free electrons. In the "off" period of the excitation cycle the lower laser level population is relaxed by inelastic collisions. It may be useful to include an admixed molecular gas such as nitrogen to promote relaxation of the lower level (without disadvantageously affecting the population of the upper level during excitation). Ideal characteristics (not fully realizable in all cases as a practical matter) of such a low-level cyclic laser are summarized below:

a. The laser transition is slow (partially forbidden). For example, it is an electric dipole radiation transition in which one or more electric dipole selection rules is violated.

b. The transition from the lower laser level to a sink level is forbidden or at least more forbidden than the transition from the sink level to the upper laser level. Energy level structures which involve a lower laser level and a sink level of the same parity are desirable.

c. The lower laser level is between about 6,000 to 18,000 wave numbers. This provides a high enough energy to give an equilibrium population of the lower level sufficiently low to permit a population inversion to be readily achieved. At the same time the energy of the lower laser level is low enough so that loss of this energy in the relaxation process produces no intolerable decrease in efficiency.

d. The transition between the ground or sink level and the upper laser level is an allowed transition and preferably the upper laser level is the first resonance level or near the first resonance level.

e. The sink level is a single isolated ground level preferably, but in any event the sink levels are few and closely spaced so that they are sufficiently populated to trap spontaneous emission from the upper laser level to the sink levels.

f. The laser working atoms are not ionized and losses involved in the ionization process are thus avoided.

g. Relaxation of the upper state may be and frequently is faster than the relaxation of the lower state. This is tolerable because achievement of a population inversion in the cyclic laser depends upon difference in excitation rates between the upper and lower levels and the process contemplates that the lower laser level will fill up to destroy the population inversion and terminate the laser pulse.

h. Relaxation of the lower level is by processes other than spontaneous emission and particularly by inelastic collisions with the laser wall or with other particles.

It should be noted that the amount of energy which can be stored in the upper level in the low-level cyclic discharge lasers is large compared with most other gas lasers. The energy density stored in the Cu $[3d^{10}(^1S)4p\ ^2P^0]$ group of levels will be approximately $10^{15}$ joules/cm.$^3$, at most.

Unfortunately, elements having appropriate energy level structures with low lying levels have partially filled electron shelves and tend to bond strongly either to themselves or to other atoms. High temperatures are usually necessary to achieve a monotomic gas at a pressure of a few Torr in these elements. This is not an insurmountable obstacle as working temperatures at least as high as 2,000° C. are feasible. For example, alumina may be utilized as a refractory container and a metal to alumina seal vacuum tight at at least 1,500° C. can be attained. Such an apparatus is suitable for laser media such as the alkaline earths, Bi, I, Cu and Mn at pressures of approximately 10 Torr, and others at lower pressures.

For still higher temperatures the refractory metal, tantalum, may be used as the laser enclosure. Such apparatus would be suitable for laser working media such as Sc, Y, and La. Unfortunately, some elements with attractive energy level structures have exceedingly high vaporization temperatures (or atomic conversion temperatures in the case of molecular media) but even with respect to these a vapor of the element may be maintained for a short period of time which may be sufficient for a laser pulse and thus feasible for a low-level cyclic laser since it is inherently a pulsed apparatus.

In view of the fact that no materials except gases are transparent (in the infrared visible or ultraviolet) above 1,500° C., it is desirable to design laser apparatus for the low-level cyclic laser wherein the windows are cool, that is, cooler than the temperature of the active laser media.

This can be accomplished by maintaining a hot central region where the laser working media is an atomic vapor and providing a buffer gas, for example, a noble gas, so that the walls of the laser or at least the windows are effectively insulated from the highest temperature portion of the laser enclosure.

Referring now to FIG. 4, a laser apparatus is shown particularly adapted for a low-level cyclic manganese or copper laser according to the present invention. The laser apparatus 101 comprises a tube 102 formed of a material such as alumina which is resistant to high temperature and to corrosive action. The alumina tube 102 which is, naturally, opaque is provided with windows 104 and 106, preferably formed of sapphire.

The windows 104 and 106 are tilted at Brewster's angle to minimize losses at the windows.

The windows may most conveniently be sealed to a glass or quartz tube such as 108 and 110, the tubes 108 and 110 being in turn secured by suitable gas tight seals 112 and 114 to the alumina tube 102.

Metal electrodes 116 and 118 are located near the ends of alumina tube 102. Electrodes 116 and 118 are connected to electrical leads 120 and 122 which may be led through the walls of tubes 108 and 110.

Accordingly, there is provided an enclosure which is hermetically sealed and is formed in part by the high temperature tolerant alumina tube 102.

The enclosure described above is filled with a noble gas to act as a buffer between the hot innermost part of the tube and the cooler windows 104 and 106 and, in operation, as a buffer for copper (or manganese) vapor 124 vaporized from a suitable reservoir of copper (or manganese) 126.

It is contemplated that the electrical discharge between electrodes 116 and 118, which may preferably be a high repetition rate pulsed discharge, will provide enough heat energy to maintain the inner enclosure of the laser at the proper temperature to generate the desired vapor pressure in the copper (or manganese) laser material. Of course auxiliary heating apparatus may readily be supplied to bring the enclosure up to its proper temperature or to maintain it at such temperature.

Means may be provided to conserve the heat generated in the laser and maintain it at proper temperature without avoidable waste of energy. For example, a vacuum envelope comprising a jacket 128 encloses the alumina tube 102. The jacket 128 is provided with expansion bellows 130 and with a reflecting surface 132 to conserve radiant heat energy.

It is apparent of course that the manner in which the heat of the central part of the laser enclosure comprising aluminum tube 102 is maintained is subject to variation and modification in accordance with well-known heating techniques.

The laser apparatus 101 may be provided with a suitable reflector system comprising for example a concave reflector 134 and a partially transparent flat reflector 136. As is well known, such a reflector system or resonator supplies the necessary regeneration for the laser apparatus to operate as an oscillator to generate coherent radiation. Other forms of reflector systems may be utilized in the laser apparatus and the particular form illustrated does not in itself form a part of the present invention.

The operation of the copper (or manganese) laser illustrated in FIG. 4 has previously been explained from a quantum-mechanical point of view and such explanation will not be repeated. It may be noted however that the apparatus of FIG. 4 is especially adapted to permit the use of laser working media requiring a very high temperature for vaporization thereof. In particular the inclusion of a buffer gas and the remote position of the windows 104 and 106 avoids damage to the windows by exposure to high temperature or to the copper (or manganese) vapor.

The vapor will naturally condense in the cooler part of the enclosure (but for the most part before reaching the windows 104 and 106). Such copper or manganese material may either be replaced from the reservoir or, if desired, provision for recirculating the manganese may be provided in the form of numerous capillary tubes or channels leading from the condensation area of the enclosure back to the high temperature portion near the reservoir.

The apparatus of FIG. 4 provides a practical and satisfactory apparatus for high temperature lasers up to a temperature of approximately 1,500° C.

Referring now to FIG. 5, a laser apparatus is shown particularly adapted for a low-level cyclic copper laser. Laser apparatus 201 comprises a tube 202 formed of a material such as quartz. The quartz tube 202 is provided with windows 201 and 206 which may also conveniently be made of quartz.

Additional interior windows 205 and 207 are provided to define evacuated enclosures 208 and 210. This arrangement serves to maintain windows 204 and 206 at a temperature approaching the ambient temperature while windows 205 and 207 may be quite hot. It may be desired to have windows 205 and 207 at a rather high temperature to prevent condensation on these interior windows.

Metal electrodes 216 and 218 are located near the ends of the interior portion of tube 202. Electrodes 216 and 218 are connected to electrical leads 220 and 222 which may be lead through the walls of tube 202.

The enclosure described above is filled with vapors of copper, iodine and copper iodide. To maintain the vapors in the enclosure at the proper pressure a reservoir 221 is provided having a heating coil 223 connected to a heater control 225. The reservoir 221 is maintained at a temperature sufficient to vaporize the copper iodide and create a pressure within the inner portion of tube 202 of approximately 0.5 to 5 Torr. (This vaporization temperature of copper iodide may be substantially less than 1,000° C., its melting point is 605° C.). The central portion of the laser enclosure will be maintained at a much higher temperature by the electrical discharge and in this region the copper iodide will dissociate to provide copper vapor. The presence of iodine vapor will not be disadvantageous and is in fact desirable to provide collision relaxation of the lower laser level. In the apparatus shown in FIG. 5, it is possible to utilize a quartz enclosure due to the fact that it is only in the interior of the enclosure that the high temperatures required to maintain atomic copper vapor at an appropriate pressure are present. The quartz walls of tube 202 are maintained at a lower temperature below 1,000° C. representative of the necessary temperature to maintain the copper iodide vapor pressure.

It is contemplated that the electrical discharge between electrode 216 and 218, which may preferably be a high repetition rate pulsed discharge, will provide the major portion of the heat energy required to maintain the inner enclosure of the laser at the proper temperature. Of course, auxiliary heating apparatus (in addition to heater 223) may be provided to bring the enclosure up to the proper temperature or to maintain it at such temperature.

It may also be desirable to maintain a low-level discharge in the tube 202 between high energy pulses so that high voltage buildup prior to striking a discharge will not take place. Better control of electron energy will thus be facilitated. Starting of the discharge may be aided by other conventional means or simply by a high pulse repetition rate. Means may be provided to conserve the heat generated in the laser and maintain it at proper temperature without significant waste of energy. For example, a vacuum envelope comprising a jacket 228 encloses the central portion of tube 202. The jacket 228 is provided with expansion bellows 230 to compensate for difference in temperature of the jacket 228 and tube 202. A reflecting surface 232 may be provided to conserve radiant heat energy. The manner in which the heat of the central part of the laser enclosure is maintained is subject to variation and modification in accordance with well-known heating techniques.

The laser apparatus 201 is provided with a suitable reflector system comprising for example a concave reflector 234 and a small flat reflector 236. The small reflector 236 is located approximately at the focal point of concave reflector 234 and together they comprise a diffraction-coupled output reflector system useful in providing an output with a high degree of coherency. Other forms of reflector systems may be utilized in the laser apparatus and the particular form illustrated does not in itself form a part of the present invention.

The cyclic laser is inherently adapted to applications which require pulsed laser operation. The suitability of the cyclic laser for such applications can be further improved by incorporating means for Q-switching whereby shorter pulses of higher peak power are provided. Whereas cyclic laser pulse lengths may be expected to be in the vicinity of $10^{16}$ seconds or $10^{17}$ seconds, by applying Q-switching techniques to the cyclic laser, pulses of $10^{18}$ seconds or shorter may be achieved. In such Q-switched pulses the total energy may be somewhat less, but the peak power will be substantially greater.

Figure 6:
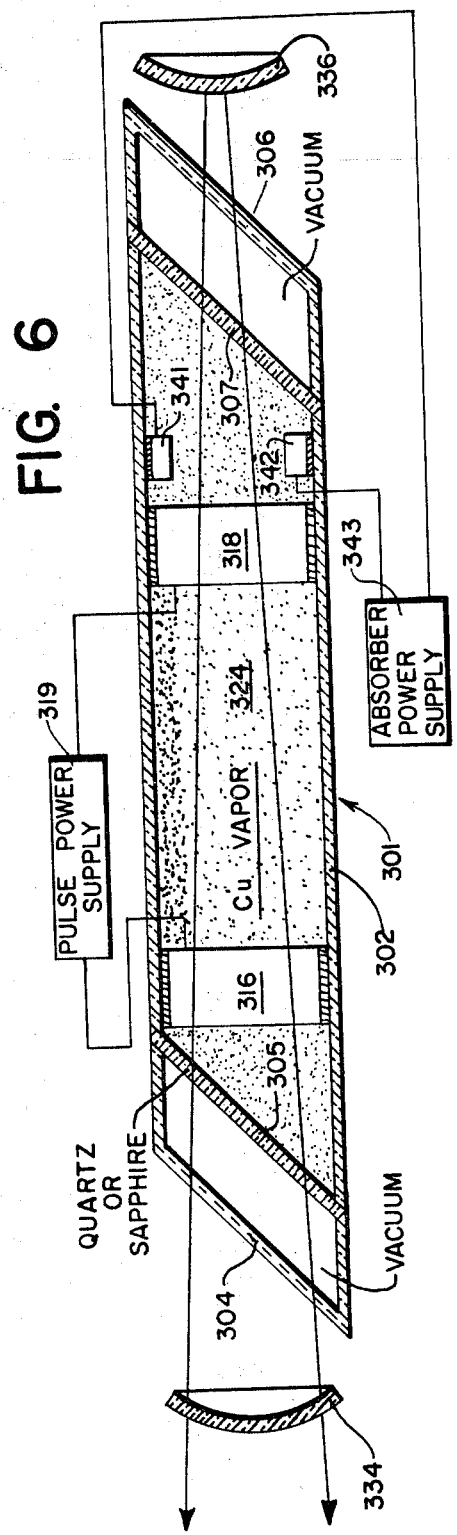
FIG. 6, is a simplified schematic diagram of a variation of laser apparatus similar to that shown in FIG. 4, but including provision for Q-switching to obtain very short pulses of high instantaneous power.

Apparatus providing a Q-switched low-level cyclic laser is shown in FIG. 6. FIG. 6 omits some of the structural details illustrated in FIGS. 4 and 5, but it will be understood that details of the construction of the apparatus of FIG. 6 may be similar to that of FIG. 4 or 5. The laser apparatus 301 comprises an enclosure 302 having external windows 304 and 306 and internal windows 305 and 307. Enclosure 302 is filled with copper vapor, in the manner shown in FIG. 4, for example. Alternatively another of the laser media of Table I may be substituted.

Electrodes 316 and 318 are provided for the generation of a pulse discharge in the copper vapor 324. A conventional pulse power supply 319 is connected to electrodes 316 and 318 to provide the pulse discharge energy. A reflector structure is provided by reflectors 334 and 336. Reflector 334 is concave and partially transparent. Reflector 336 is preferably totally reflecting and is illustrated as slightly convex. Reflectors 334 and 336 have a common center of curvature so that the active region of the laser is conical in form. Alternatively, reflector 336 may be flat and placed at the center of curvature of reflector 334.

At the small end of the conical active laser volume are placed electrodes 341 and 342 for generating a transverse discharge through the copper vapor. This is a substantially continuous discharge, power for which is supplied from power supply 343.

By virtue of the discharge between electrodes 341 and 342 the region of copper vapor between these electrodes is highly absorbing of laser radiation. The absorbing nature of this volume of copper vapor is due to the fact that the upper laser energy level in this region of vapor has a much lower population than the lower laser energy level.

The operation of the laser apparatus 301 differs from the operation of apparatus previously described in that there is a strong absorber present in the laser apparatus by virtue of electrodes 341 and 342. This absorber is, however, saturable or nonlinear. That is, when sufficient energy has been absorbed to saturate the upper laser energy level, the condition of the absorbing region changes and it becomes virtually transparent.

Accordingly, in the apparatus of FIG. 6, the onset of laser oscillation is retarded until a very large population inversion is present in the region between electrodes 316 and 318 so that the gain provided by the laser medium is sufficient to overcome the loss introduced in the region between electrodes 341 and 342. Laser operation then commences and immediately saturates the absorbing region between electrodes 341 and 342. This immediate saturation is brought about by virtue of the fact that the active laser volume is of small cross section and hence the energy concentration at that point in the laser beam is exceptionally high.

When the absorbing region between electrodes 341 and 342 becomes saturated and effectively transparent, the total laser gain becomes very high due to the large population inversion and the stored laser energy accordingly is emitted in a very short and intense pulse.

Thus, it will be seen that the cyclic laser apparatus is readily adapted to provide a Q-switched pulse laser output with a minimum of additional apparatus.

Modifications and additions to those suggested and other variations with respect to the present invention will be apparent to those of skill in the art. Accordingly, it is desired that the scope of the present invention not be limited to those variations and modifications suggested, but that it be defined by reference to the appended claims.

We claim:

1. The method of pulse operating a laser in a low energy level mode comprising the steps of:
   a. providing a material within a bounded volume,
   b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term,
   c. cyclically exciting electrons within the atoms of said gas by collisions to provide a periodic population inversion between said pair of levels and a subsequent output light pulse generated by stimulated emission,
   d. interacting said atomic gas with agents within said bounded volume to provide for relaxation of said electrons from the lower one of said pair of levels to said sink level during intervals between said pulse of light and periods of excitation in order to prepare said gas to its next cyclic excitation.

2. The method of pulse operating a laser in a low energy level mode comprising the steps of:
   a. providing a material within a bounded volume,
   b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term, the lower one of said pair of energy levels being between about 6,000 and 18,000 wave numbers above said sink level,
   c. cyclically exciting electrons within the atoms of said gas by collisions to provide a periodic population inversion between said pair of levels and a subsequent output light pulse generated by stimulated emission,
   d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

3. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term, wherein the transition defined by said sink level and the upper one of said pair of levels is an allowed electric dipole transition,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

4. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation,
 e. causing said pulse of stimulated light to repetitively traverse said bounded volume to produce a regenerative oscillation.

5. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition and having a third and lesser energy sink of the same parity as the lower one of said pair of energy levels and consisting of at least one level in its ground spectroscopic term,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

6. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition, the lower one of said pair of levels belonging to the first spectroscopic term above the ground term, and having a third and lesser energy sink consisting of at least one level in its ground spectroscopic term,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

7. The method of pulse operating a laser in a low energy level mode comprising the steps of:
 a. providing a material within a bounded volume,
 b. heating said material to a temperature in excess of 1,000° C. to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

8. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition, the upper one of said levels being a resonance level, and having a third and lesser energy sink consisting of at least one level in its ground spectroscopic term,
 c. cyclically exciting electrons within the atoms of said gas by collisions to provide a periodic population inversion between said pair of levels and a subsequent output light pulse generated by stimulated emission,
 d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

9. The method of pulse operating a laser in a low energy level mode comprising the steps of:
 a. providing a material within a bounded volume,
 b. heating said material to provide a neutral atomic laser medium of the same material within said volume having a pair of energy levels with an energy separation, corresponding to a light wave frequency, defining a partially forbidden electric dipole transition and having a third and lesser energy sink consisting of the single ground level in its ground spectroscopic term,
 c. cyclically exciting electrons within the atoms of said gas by collisions to provide a periodic population inversion between said pair of levels and a subsequent output light pulse generated by stimulated emission,
d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

10. The method of pulse operating a laser in a low energy level mode comprising the steps of:
   a. providing a material within a bounded volume,
   b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term, the lower one of said pair of levels being not less than 6,000 wave numbers above said sink level,
   c. cyclically exciting electrons within the atoms of said gas by collisions to provide a periodic population inversion between said pair of levels and a subsequent output light pulse generated by stimulated emission,
   d. interacting said atomic gas with agents within said bounded volume to provide for relaxation of said electrons from the lower one of said pair of levels to said sink level during intervals between said pulse of light and periods of excitation in order to prepare said gas for its next cyclic excitation.

11. The method of pulse operating a laser in a low energy level mode comprising the steps of:
   a. providing a material within a bounded volume,
   b. heating said material to provide a neutral atomic laser medium of the same material within said volume having a pair of energy levels with an energy separation, corresponding to a light wave frequency, defining a partially forbidden electric dipole transition and having a third and lesser energy sink consisting of at least one level in its ground spectroscopic term, the upper one of said pair of levels being the first resonance level above ground,
   c. cyclically exciting electrons within the atoms of said gas by collisions to provide a periodic population inversion between said pair of levels and a subsequent output light pulse generated by stimulated emission,
   d. interacting said atomic gas with agents within said bounded volume to provide for relaxation of said electrons from the lower one of said pair of levels to said sink level during intervals between said pulse of light and periods of excitation in order to prepare said gas for its next cyclic excitation.